(12) United States Patent
Schoenwald (10) Patent No.: US 9,380,324 B2
(45) Date of Patent: Jun. 28, 2016

(54) VIDEO CONTENT DISTRIBUTION PACKAGE

(71) Applicant: Steven Schoenwald, Hinckley, OH (US)

(72) Inventor: Steven Schoenwald, Hinckley, OH (US)

(*) Notice: Subject to any disclaimer, the term of this patent is extended or adjusted under 35 U.S.C. 154(b) by 99 days.

(21) Appl. No.: 14/162,573

(22) Filed: Jan. 23, 2014

(65) Prior Publication Data

US 2014/0205265 A1     Jul. 24, 2014

Related U.S. Application Data

(60) Provisional application No. 61/755,768, filed on Jan. 23, 2013.

(51) Int. Cl.
| | |
|---|---|
| *H04N 21/23* | (2011.01) |
| *H04N 21/232* | (2011.01) |
| *H04N 21/2343* | (2011.01) |
| *H04N 21/422* | (2011.01) |
| *H04N 21/6334* | (2011.01) |
| *H04N 21/84* | (2011.01) |
| *H04N 21/858* | (2011.01) |
| *G11B 27/32* | (2006.01) |

(52) U.S. Cl.
CPC ... *H04N 21/2323* (2013.01); *H04N 21/234318* (2013.01); *H04N 21/422* (2013.01); *H04N 21/6334* (2013.01); *H04N 21/84* (2013.01); *H04N 21/8583* (2013.01); *G11B 27/322* (2013.01)

(58) Field of Classification Search
None
See application file for complete search history.

(56) References Cited

U.S. PATENT DOCUMENTS

| | | | |
|---|---|---|---|
| 6,011,872 | A | 1/2000 | Qian et al. |
| 6,529,949 | B1 | 3/2003 | Getsin et al. |
| 6,707,949 | B2 | 3/2004 | Haskell et al. |
| 7,248,694 | B2 | 7/2007 | Husemann et al. |
| 7,565,700 | B2 | 7/2009 | Bellwood et al. |
| 7,987,478 | B2 | 7/2011 | Minor |
| 8,108,493 | B2 | 1/2012 | Lakamp et al. |
| 8,200,700 | B2 | 6/2012 | Moore et al. |
| 8,296,335 | B2 | 10/2012 | Bouve et al. |
| 8,312,491 | B2 | 11/2012 | Cope et al. |
| 8,467,600 | B2 | 6/2013 | Boncyk et al. |
| 2002/0001411 | A1 | 1/2002 | Suzuki et al. |
| 2004/0233233 | A1 | 11/2004 | Salkind et al. |
| 2007/0263126 | A1* | 11/2007 | Chao ............. H04N 5/144 348/607 |
| 2008/0276272 | A1 | 11/2008 | Rajaraman et al. |
| 2008/0319852 | A1 | 12/2008 | Gardner et al. |

(Continued)

FOREIGN PATENT DOCUMENTS

| | | |
|---|---|---|
| WO | WO 2013/138370 | 9/2013 |
| WO | WO 2013/149257 | 10/2013 |

*Primary Examiner* — Eileen Adams
(74) *Attorney, Agent, or Firm* — Tarolli, Sundheim, Covell & Tummino LLP (57) ABSTRACT

Systems and methods are provided for a content distribution system, packaged as executable instructions stored on a non-transitory computer readable medium. The system includes a cross-platform video player, implemented as machine executable instructions executable on a host computer having any of a plurality of different operating environments and a video comprising a plurality of video frames. The system further includes a library of content items associated with the video. The library of content items includes a plurality of content items and metadata relating each of the content items to associated spatial locations in at least one frame of the video. Each of the cross-platform video player, the video, and the library of content items are packaged as a single cross-platform executable file.

20 Claims, 3 Drawing Sheets

(56) References Cited

U.S. PATENT DOCUMENTS

| | | |
|---|---|---|
| 2010/0158099 A1 | 6/2010 | Kalva et al. |
| 2011/0243525 A1 | 10/2011 | Chaudhri et al. |
| 2012/0047437 A1 | 2/2012 | Chan |
| 2012/0167146 A1 | 6/2012 | Incorvia |
| 2012/0179742 A1* | 7/2012 | Acharya ............... H04N 7/18 709/202 |
| 2013/0044824 A1* | 2/2013 | Vestergaard .......... G06F 3/14 375/240.25 |
| 2013/0066623 A1 | 3/2013 | Chou et al. |
| 2013/0232430 A1 | 9/2013 | Reitan |

* cited by examiner

VIDEO CONTENT DISTRIBUTION PACKAGE

RELATED APPLICATIONS

This application claims priority to U.S. Provisional Patent Application Ser. No. 61/755,768, filed Jan. 23, 2013, the entirety of is herein incorporated by reference.

FIELD OF THE INVENTION

The invention relates generally to media distribution, and more specifically, to a content distribution package for video.

BACKGROUND OF THE INVENTION

Electronic learning refers to the use of electronic media and information and communication technologies in education. Electronic learning includes numerous types of media that deliver text, audio, images, animation, and streaming video, and includes technology applications and processes such as audio or video tape, satellite TV, CD-ROM, and computer-based learning, as well as local intranet/extranet and web-based learning. Information and communication systems, whether free-standing or based on either local networks or the Internet in networked learning, underlie many electronic learning processes. Electronic learning can occur in or out of the classroom, and can be self-paced, asynchronous learning or instructor-led, synchronous learning. It is well-suited to distance learning and flexible learning, but it can also be used in conjunction with face-to-face teaching, in which case the term blended learning is commonly used.

SUMMARY OF THE INVENTION

In accordance with an aspect of the present invention, a content distribution system, packaged as executable instructions stored on a non-transitory computer readable medium, is provided. The system includes a cross-platform video player, implemented as machine executable instructions executable on a host computer having any of a plurality of different operating environments and a video comprising a plurality of video frames. The system further includes a library of content items associated with the video. The library of content items includes a plurality of content items and metadata relating each of the content items to associated spatial locations in at least one frame of the video. Each of the cross-platform video player, the video, and the library of content items are packaged as a single cross-platform executable file.

In accordance with another aspect of the present invention, a content distribution system, packaged as executable instructions stored on a non-transitory computer readable medium, is provided. The system includes a cross-platform video player, implemented as machine executable instructions executable on a host computer having any of a plurality of different operating environments. The cross-platform video player includes a mouse listener configured to detect a motion of a mouse cursor associated with the host computer. Each of the content items having an associated video object relating the content item to associated spatial locations in at least one frame of the video, such that the cross-platform video player is configured to detect when the mouse cursor is collocated with a video object. Each video object is associated with an object displayed as part of the video, such that, for each frame in which the object is displayed within the video, the video object is substantially coextensive with the displayed object. The system further includes a video comprising a plurality of video frames and a library of content items associated with the video. The library of content items includes a plurality of content items and metadata relating each of the content items to their associated spatial locations in at least one frame of the video. The cross-platform video player is configured to display a given content item when the mouse cursor is collated with its associated video object.

In accordance with yet another aspect of the present invention, a method is provided for generating a cross-platform executable file that is executable on a host computer having any of a plurality of different operating environments and stored on a non-transitory computer readable medium. A directory is created on the non-transitory computer readable medium. A video, comprising a plurality of video frames, and a plurality of content items associated with the video are stored in the directory. Metadata relating each of the content items to associated spatial locations in at least one frame of the video in the directory is stored in the directory. Source code for a video player is complied to provide the cross-platform executable file. The cross-platform executable filing includes each of the video player, the video, the library of content items, and the metadata.

BRIEF DESCRIPTION OF THE DRAWINGS

The features, objects, and advantages of the invention will become more apparent from the detailed description set forth below when taken in conjunction with the drawings, wherein.

DETAILED DESCRIPTION OF THE INVENTION

Figure 1:
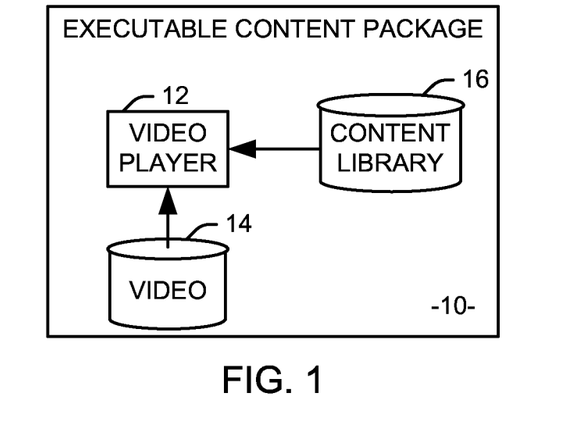
FIG. 1 illustrates a video content distribution package in accordance with an aspect of the present invention.

FIG. 1 illustrates a video content distribution package 10 in accordance with an aspect of the present invention. The video player 10 includes a cross-platform video player 12 configured to play an associated item of media 14. As used herein, a "cross-platform" video player is a media player that is implemented and inter-operative on multiple computer platforms. In other words, the video player 12 can operate in multiple operating environments, including two or more of Microsoft Windows, Linux, and Mac OS. It will be appreciated that the video player can be entirely self-contained, rely on library components from an appropriate cross-platform framework, such as Java, installed on a host machine, or can be configured to use video codecs installed on the host machine. In accordance with an aspect of the present invention, the video player can be configured to associate specific temporal and spatial locations of the video with video objects from an associated content library 16. A video object, as referred to in this document, is any object that is drawn over the playing video. In one implementation, the video object can be in the shape of any generic polygon, such as a rectangle or triangle, or a circle. In another implementation, the video object can be defined for each frame to include all pixels representing an object of interest within the video. The border lines of the object may be visible or invisible. A video object can also have a fill with some amount of transparency, such that a visible effect is produced within the video.

It will be appreciated that video objects are not hardcoded in the video stream 14 itself but are rather dynamically added as the video plays. The video object must have a clearly defined shape for each frame so that it can be clearly defined when a user moves the mouse into the object. Each video object is associated with a content item from the content library, such that when the user interacts with a video object within the video, the content item is retrieved and displayed to the user. In one implementation, each video object is a relatively simple shape, such as a circle, rectangle, or polygon, with the location of the shape defined by a reference coordinate pair representing a centerpoint or designated vertex of the shape.

In another implementation, each video object represents an object displayed within the video, and the video object is shaped such that it is substantially coextensive with the represented object. For example, if the represented object is a car that appears within the video, the video object, within each frame, will be shaped as to encompass those pixels comprising the car within that frame. This can be accomplished manually or semi-manually, with an administrator selecting the represented pixels in each frame, or via an automated object recognition algorithm that identifies the object within each frame. For example, a windowing and template matching algorithm could be utilized to find a rough location of the represented object within each frame, and an appropriate edge detection algorithm could be employed to determine fine boundaries. It will be appreciated that this highlighting process can be used to locate objects in both two-dimensional and three-dimensional video presentations.

Once the application is launched by a user, for example, by clicking on an executable file containing the video player 10, the video window is built, although it is not necessarily displayed immediately. The video window comprises a panel for the actual video and a control panel for the video, with the control panel having at least basic options such as play, pause, fast forward, and full screen commands. The initial dimensions of the video window (i.e., height and width) are stored as in-memory variables, and can be used, for example, to appropriately scale the video objects from the content library 16 if the user modifies the video window while the video is playing. In one implementation, two instance variables can be used to store the width and height, such that:

originalHeight=frame.getHeight( );
originalWidth=frame.getWidth( );
where frame is the object containing the video.

Once the video window has been created, a mouse listener is added. The video window is then made visible. The mouse listener for the window can detect whenever the user moves their mouse in and out of the window and can provide the current position of the mouse when requested. Table 1 provides exemplary code for implementing a mouse listener that monitors the user's mouse movement within the video player frame. Anytime the user moves the mouse within the video player frame the method mouseMoved( ) is executed

TABLE 1

```
frame.addMouseMotionListener(new java.awt.event.-
MouseMotionListener( ) {
    @Override
    public void mouseMoved(MouseEvent e) {
```

TABLE 1-continued

```
        if (stillDisplaying)
            timerFlag = true;
        else
            showButtons( );
        int x = e.getX( );
        int y = e.getY( );
        int boxNumber = checkLineFormation(x, y);
        if (boxNumber != -1) {
            try {
                updatePopupWindow(boxNumber);
                popup.setSize((int)(popupWidthRatio*-
                originalWidth),
                    (int)(popupHeightRatio*frame.-
                    getHeight( )));
                popup.setVisible(true);
                popup.setAlwaysOnTop(true);
            } catch (JSONException e1) {
                e1.printStackTrace( );
            }
        }
        else
            boxNumber = checkCirclesAndRectangles(x,y);
        if (boxNumber != -1) {
            updatePopupWindow(boxNumber);
            popup.setSize((int)(popupWidthRatio*-
            originalWidth),
                (int)(popupHeightRatio*frame.getHeight( )));
            popup.setVisible(true);
            popup.setAlwaysOnTop(true);
        }
        else
            popup.setVisible(false);
    }
});
```

Once the video window has been prepared with its panels and mouse listener, the program retrieves a metadata file contained in the content library 16 containing all of the data for the video objects. The metadata includes an array of video objects for each frame in the video. Each member in the array should contain itself a key-value dictionary containing keys for the particular video object's description, link, and image. The information should contain the positions, the effects, the shapes, the links, the pictures, and the descriptions for each video object. The information is used to display video popups representing the objects as well as video effects.

The video 14 is then retrieved as a buffer stream and stored in memory, allowing the video to begin its playback. A frame index variable, used to monitor what frame the video is currently displaying, is initialized at zero. The data for each new frame is retrieved from a buffer, decoded, and displayed over the old frame. The frame index variable is then incremented. The data for the video objects is then queried with the key of the frame index variable to return a value of an array defining the video object information for the current frame. The location and the effect for each video object is stored in this array, such that the program can loop through the array, displaying the effect of each video object at the appropriate position. The starting position, for example defined as a coordinate pair, of the effect can be scaled to match the video window. It will be appreciated, however, that a given video object can have a width and a height significantly greater than one pixel, and may have a basic, polygon shape, in which case the coordinate pair merely defines a reference point on the predefined shape, or a more complex shape representing an object in the video, in which case the shape may be defined by multiple coordinate pairs.

Figure 2:
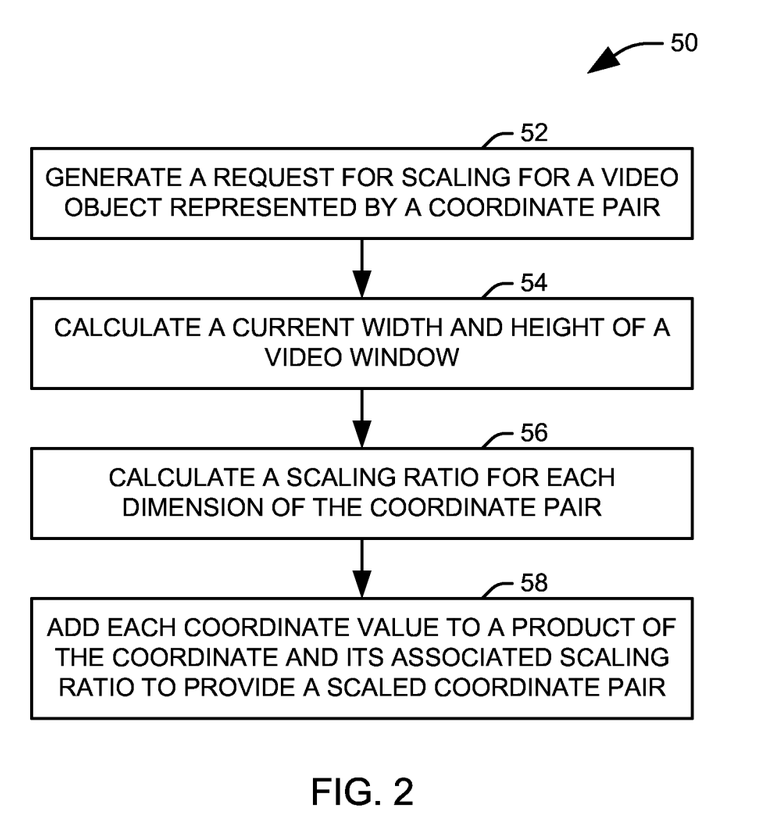
FIG. 2 illustrates a method for scaling video objects in accordance with an aspect of the present invention.

FIG. 2 illustrates a method 50 for scaling video objects in accordance with an aspect of the present invention. As discussed previously, at the time the video player is executed, a video window is built with an initial width and height, the values of which are calculated and stored in memory. As the video plays, the height and width of the video may be changed by a user, requiring that the application scale the video objects and their effects to account for these changes. At 52, a request for scaling is generated is generated, including a coordinate pair, (x, y), associated with a video object to be scaled. It will be appreciated that the requests can be for either scaling the position of the video objects or for the starting position of the video effect. At 54, the current width and height of the video is calculated. This can be done in a manner similar to finding the initial width and height:

int currentHeight=frame.getHeight( );
    int currentWidth=frame.getWidth( );
    where frame is the video object.

At 56, scaling ratios are calculated for each of the dimensions of the coordinate pair. A width ratio, $R_W$, is calculated as:

$$R_W = \frac{(W_c - W_i)}{W_i} \qquad \text{Eq. 1}$$

where $W_i$ is the initial width, and $W_c$ is the current width. A height ratio, $R_H$, is calculated as:

$$R_H = \frac{(H_c - H_i)}{H_i} \qquad \text{Eq. 2}$$

where $H_i$ is the initial height, and $H_c$ is the current height.

After the scaling ratios have been calculated, the coordinates are transformed at 58. Specifically, each coordinate is multiplied by its associated scaling ratio and added to its original value to provide a scaled coordinate pair, (x', y'), wherein x'=x+x*$R_W$ and y'=y+y*$R_H$. The scaled coordinate pair is then used as the location for the object.

Returning to the description of FIG. 1, while the video is playing, the mouse listener monitors for mouse movement into the video window. If there the mouse is not detected inside of the video window, then the application simply continues playing. Once the mouse is detected inside of the video window, a control panel of the video player is displayed in the video window. Monitored regions (e.g., in the mouse listener or additional instantiations of the mouse listener) can be added to the video to monitor entry and exit of the mouse in regions associated with each of the components of the control panel, including, for example, play, pause, rewind, fast forward, and resize buttons. Each of the control panel and its constituent components can have associated counters representing the aggregate number of times that mouse had entered, exited, and been clicked or released within their associated region of the video window. Such information can be utilized, for example, in an online learning application to inform an instructor how a student is interacting with the video. For example, repeated rewinding or pausing of the video may be evidence that the video content might require additional emphasis in future lessons. Such information can be similarly useful for commercial content, for example, in determining how the user has interacted with the video during advertisements. To this end, the video player can also record points in which focus was taken from the video window.

A mouse counter variable can be used to determine when the control panel should be displayed or hidden. As the video plays, the mouse listeners monitor movements into and out of the various components. Whenever any one of the mouse listeners determine that the mouse has moved into the component's area, then the counter variable is incremented by one, and the video control panel is displayed. After the video control panel has been displayed, the counter variable is decremented by one.

Whenever it is determined that the mouse has moved out of the component's area, there should be a slight delay to allow for other mouse listeners to register the mouse movement inside the component it is listening for. In one example, a delay of around one hundred milliseconds is used. After the delay, the counter variable is evaluated, and if the counter variable is zero, the video control panel is hidden. If the counter variable is greater than zero, then the video control panel is displayed and the counter variable is decremented by one.

Similarly, when the mouse is within the video window, the video player can monitor the video objects in a given frame to determine if mouse motion into the video window has placed the mouse over one of the video objects. If the mouse is not over any of the video objects, the video continues playing. Once the mouse is determined to be inside one of the video objects, then the content item for the video object is retrieved from the data dictionary for video objects. A popup is then displayed with the retrieved content item. Effectively, when the mouse is detected inside one of the video objects, the dictionary for the video object is queried for whatever content item the popup should display. The content item could include an image, a text description, a video stored in the content library and/or a link to a resource outside of the content library. A popup is made visible with this information with a size of the popup being determined as a predefined ratio of the video window. The popup window is hidden when the user moves out of the video window completely.

Figure 3:
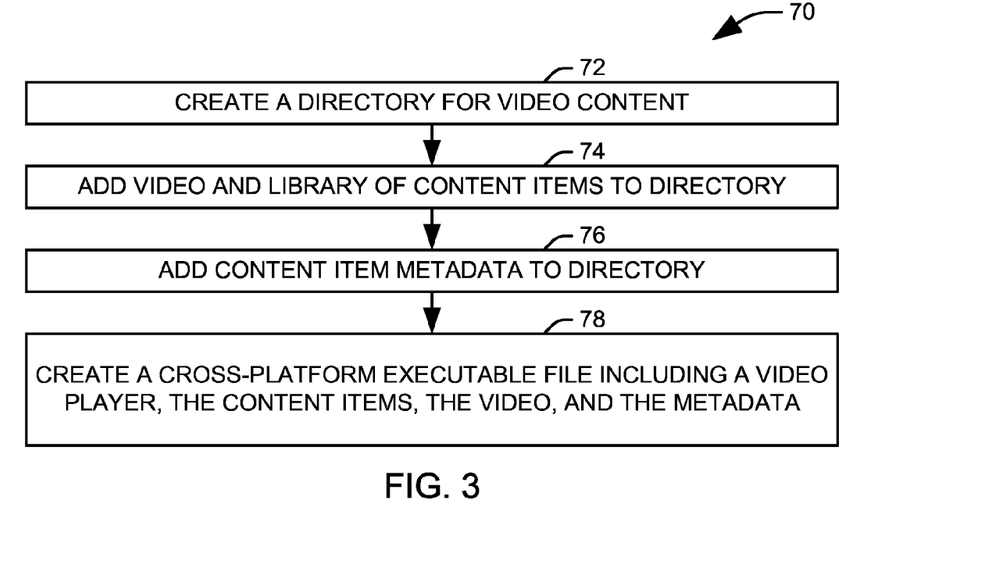
FIG. 3 illustrates a method for generating a content distribution system in accordance with an aspect of the present invention.

FIG. 3 illustrates a method 70 for generating a content distribution system in accordance with an aspect of the present invention. At 72, a directory that will contain video content, that is, the video file and the library of content objects for the video is created. The path, which is relative to the source code of the cross-platform video player, and the name for the directory are specified in the source code. In the illustrated implementation, the path and the name in the source code are adhered to strictly, as the application will search for the video file and the video objects file in the specified location.

At 74, each of the video file and the library of content items is added to the created directory. In one implementation, other files can also be added to the directory which can be opened through external programs. These files can be of any extension, and if recognized by an operating system of the host computer, can be opened with an associated program. Unlike the content items, these files are intended to be viewable to the end users outside of the context of the video. In one example, a menu button could be added to the video player to display attached documents. When an attached document is requested to be viewed, then the application should call the operating system to open the document using the computer's default program for the document type. At 76, the file containing the metadata for displaying embedded video objects during the video and relating them to content items is added to the created directory. At 78, a cross-platform executable file, including at least the video player and the contents of the directory, is built from the source code for the video player. In one example, the executable file is a Java Archive (JAR) built either manually using the Java compiler and a Java Archive application or through a Java Integrated Development Environment (IDE), such as NetBeans or Eclipse.

Figure 4:
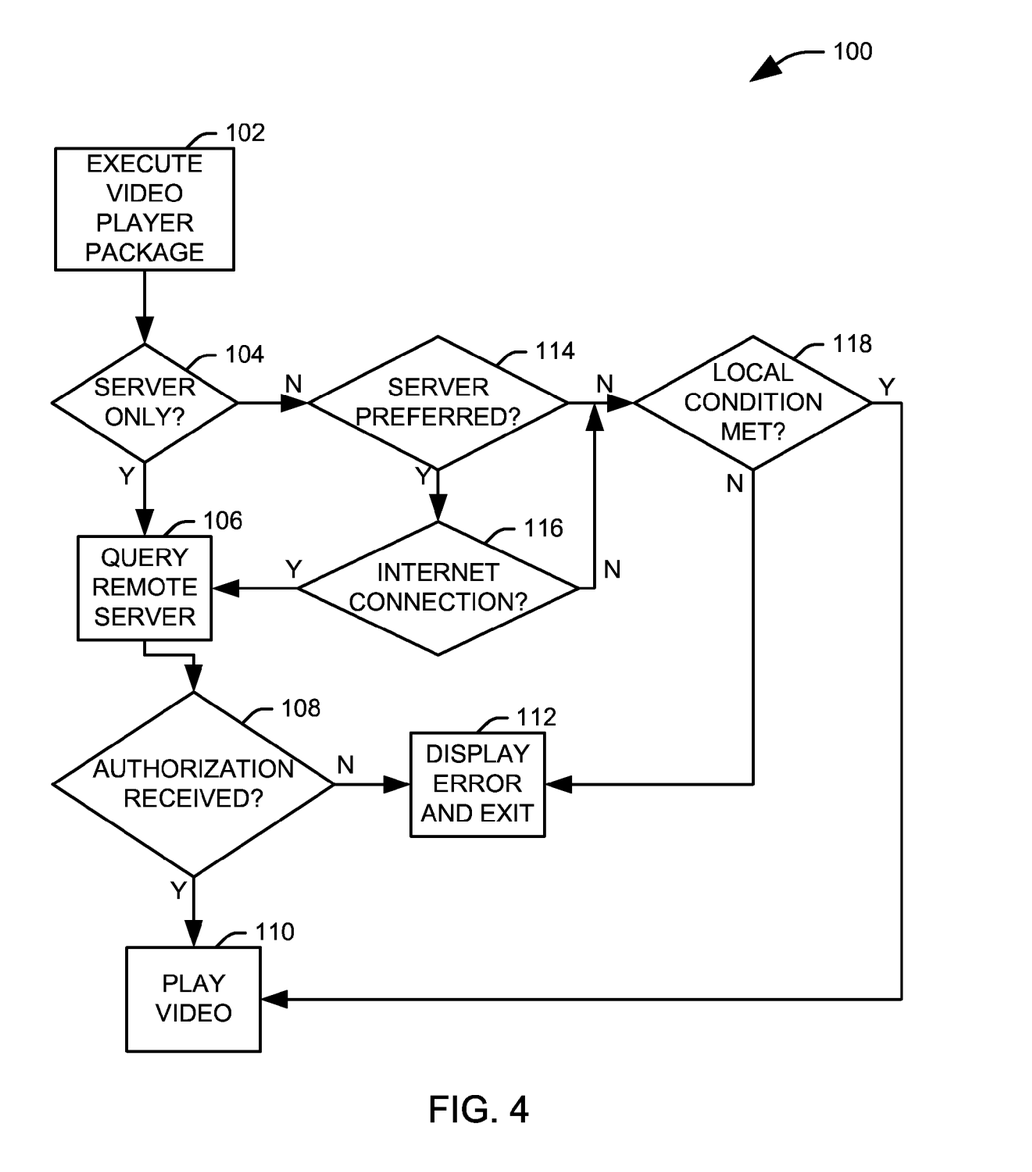
FIG. 4 illustrates a method for determining if a user has authorization to view a video from a video content distribution package in accordance with an aspect of the present invention.

FIG. 4 illustrates a method 100 for determining if a user has authorization to view a video from a video content distribution package in accordance with an aspect of the present invention. At 102, a user executes the packaged video player. At 104, it is determined if the video player requires permission from a remote server to play the video. In one implementation, the video player checks a value of a variable associated with the content distribution package referred hereinafter as the "server only" variable determines if the user must always receive permission from a server associated with the content provider to play the video. If the server only variable is set to true (Y), the video player queries the remote server at 106. It will be appreciated that the host computer must be connected to the Internet to successfully query and receive authorization from the remote server. In the illustrated implementation, the user must pass correct credentials, such as username and password, to the remote server as part of the query.

After the request is made to the remote server, the video player waits for authorization at 108. If the user's credentials are approved by the remote server (Y), then the user has permission to play the video and the video begins playing at 110. If the user's credentials are not accepted the remote server (N), then the user does not have permission to play the video. An error message is displayed to the user at 112 and the video player program exits. As part of the failure to authenticate, the video player can send the remote servers a message of the failure, assuming the user has Internet connectivity.

Returning to 104, if the server only variable is set to false (N), a second variable is checked, referred to as a "server preferred" variable. When this variable is set to true (Y), the user must receive authorization from the server if an Internet connection is available for this purpose. Accordingly, a test of Internet connectivity is made at 116. If an Internet connection is present (Y), the method advances to 106, where the remote server is queried. If no Internet connection is present (N), or if both the server only and the server preferred variables are set to false, the user can play the video without an Internet connection as long as a local condition is met. If the condition is met (Y), the video plays normally at 110, and if the condition is not met (N), an error message is displayed at 112.

In one implementation, the condition to be met is that video is not past a defined expiration date according to local computer time. To this end, a comparison is made between the current time on the user's computer and the stored expiration date hardcoded into the video package. If the current computer date is before the hardcoded expiration date, then the user can play the video and the video begins playing. If the current computer date is after the hardcoded expiration date, then the user cannot play the video. An error message is displayed to the user and the program exits.

One additional security feature for the system is referred to as secondary stream static. In the video package, a second audio stream is present in the video containing static or another sound intended to interfere with comprehension and enjoyment of the sound associated with the video. The video player is able to differentiate between the two audio streams and mute the static stream. The computer would still register two streams on the audio card. Accordingly, while the secondary stream is filtered out by the player, any attempt to save the audio produced at the video player to the host computer retains the static, such that the desired audio is substantially obscured. This allows unauthorized reproduction of the video and its associated audio to be discouraged.

Figure 5:
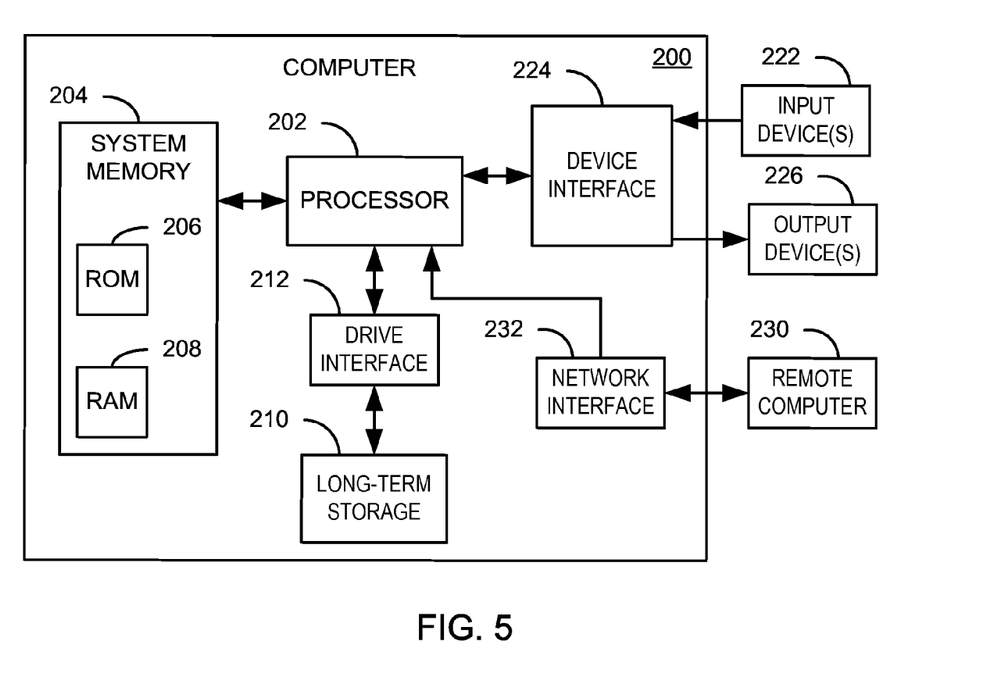
FIG. 5 is a schematic block diagram illustrating an exemplary system of hardware components capable of implementing examples of the systems and methods disclosed in FIGS. 1-4.

FIG. 5 is a schematic block diagram illustrating an exemplary system 200 of hardware components capable of implementing examples of the systems and methods disclosed in FIGS. 1-4. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand-alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a predictive modeling system in accordance with the present invention. Computer executable logic for implementing the composite applications testing system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

I claim:

1. A content distribution system, packaged as executable instructions stored on a non-transitory computer readable medium, the instructions comprising:
   a cross-platform video player, implemented as machine executable instructions executable on a host computer having any of a plurality of different operating environments, the cross-platform video player comprising a mouse listener configured to detect a motion of a mouse cursor associated with the host computer; a video comprising a plurality of video frames; and a library of content items associated with the video, the library of content items comprising a plurality of content items and metadata relating each of the content items to associated spatial locations in at least one frame of the video, each of the content items having an associated video object relating the content item to its associated spatial locations in at least one frame of the video;

wherein the cross-platform video player is configured to track a position of the mouse cursor based on the detected motion to detect when the mouse cursor is collocated with a video object and each of the cross-platform video player, the video, and the library of content items are packaged as a single cross-platform executable file.

2. The content distribution system of claim 1, wherein each content item of the library of content items comprises one of an image, a text description, a video, and a link to a resource outside of the content library.

3. The content distribution system of claim 1, wherein the cross-platform video player is configured to display the associated content item from the content library each time the mouse cursor is collocated with a video object.

4. The content distribution system of claim 1, wherein each video object is associated with an object displayed as part of the video, such that, for each frame in which the object is displayed within the video, the video object is substantially coextensive with the displayed object.

5. The content distribution system of claim 1, wherein each video object is defined as a predetermined shape and a reference coordinate pair associated with each frame in which the video object appears.

6. The content distribution system of claim 5, wherein the cross-platform video player is configured to scale each of the predetermined shape and the reference coordinate pair in each frame as a function of the initial height and width of a video window associated with the cross-platform video player, and a height and width of the video window during the frame.

7. The content distribution system of claim 6, wherein the cross-platform video player is configured to scale a given coordinate pair (x, y) to a scaled coordinate pair (x', y') such that given a video window with an initial height, $H_i$, an initial width, $W_i$, a current height $H_c$, and a current width $W_c$:

$$x' = x + \frac{x(W_c - W_i)}{W_i} \text{ and } y' = y + \frac{y(H_c - H_i)}{H_i}.$$

8. The content distribution system of claim 6, wherein the predetermined shape is a convex polygon.

9. The content distribution system of claim 1, wherein the cross-platform video player is configured to query a remote server via an Internet connection associated with the host computer for authorization to play the video.

10. The content distribution system of claim 1, wherein the video comprises a first media stream, consisting of static, and a second media stream, and the cross-platform video player is configured to filter out the first media stream during playback of the video.

11. A content distribution system, packaged as executable instructions stored on a non-transitory computer readable medium, the instructions comprising:
a cross-platform video player, implemented as machine executable instructions executable on a host computer having any of a plurality of different operating environments, the cross-platform video player comprising a mouse listener configured to detect a motion of a mouse cursor associated with the host computer and each of the content items having an associated video object relating the content item to its associated spatial locations in at least one frame of the video, such that the cross-platform video player is configured to detect when the mouse cursor is collocated with a video object, wherein each video object is associated with an object displayed as part of the video, such that, for each frame in which the object is displayed within the video, the video object is substantially coextensive with the displayed object;
a video comprising a plurality of video frames; and
a library of content items associated with the video, the library of content items comprising a plurality of content items and metadata relating each of the content items to associated spatial locations in at least one frame of the video;
wherein the cross-platform video player is configured to display a given content item when the mouse cursor is collated with its associated video object.

12. The content distribution system of claim 11, wherein each of the cross-platform video player, the video, and the library of content items are packaged as a single cross-platform executable file.

13. The content distribution system of claim 11, wherein the cross-platform video player is configured to check first and second variables associated with a given video and selectively query a remote server via an Internet connection associated with the host computer for authorization to play the video based upon the values of the first and second variables and the availability of an Internet connection at the host computer.

14. The content distribution system of claim 13, wherein the cross-platform video player is configured to play the video only if authorization is available from the remote server if the first variable has a first value or the first variable has a second value and the second variable has the first value and an Internet connection is available, and to play the video based on whether a current time is not later than an expiration date associated with the video if each of the first and second variables have the second value or the first variable has a second value and the second variable has the first value and an Internet connection is not available.

15. The content distribution system of claim 11, wherein each content item of the library of content items comprises one of an image, a video, a text description, and a link to a resource outside of the content library.

16. A method for generating a cross-platform executable file, executable on a host computer having any of a plurality of different operating environments and stored on a non-transitory computer readable medium, comprising:
creating a directory on the non-transitory computer readable medium; storing a video comprising a plurality of video frames and a plurality of content items associated with the video in the directory;
storing metadata relating each of the content items to associated spatial locations in at least one frame of the video in the directory; and
compiling source code for a video player to provide the cross-platform executable file, the cross-platform executable filing including each of the video player, the video, the library of content items, each having an associated video object relating the content item to its associated spatial locations in at least one frame of the video, the metadata, and a mouse listener configured to detect a motion of a mouse cursor associated with the host computer, such that the cross-platform video player is configured to track a position of the mouse cursor based on the detected motion to detect when the mouse cursor is collocated with a video object.

17. A content distribution system, packaged as executable instructions stored on a non-transitory computer readable medium, the instructions comprising:
- a cross-platform video player, implemented as machine executable instructions executable on a host computer having any of a plurality of different operating environments, the cross-platform video player being configured to query a remote server via an Internet connection associated with the host computer for authorization to play the video, check a value of a first variable upon execution of the cross-platform executable file, and, if the first variable has a first value, play the video only if authorization is available from the remote server;
- a video comprising a plurality of video frames; and
- a library of content items associated with the video, the library of content items comprising a plurality of content items and metadata relating each of the content items to associated spatial locations in at least one frame of the video;

wherein each of the cross-platform video player, the video, and the library of content items are packaged as a single cross-platform executable file.

18. The content distribution system of claim 17, wherein the cross-platform video player is configured to check a value of a second variable, such that if the first variable has a second value and the second variable has the first value, the cross-platform video player is configured to seek authorization from the remote server only if an Internet connection is available, and play the video if a condition associated with the video is met if no Internet connection is available.

19. The content distribution system of claim 18, wherein the cross-platform video player is play the video if a condition associated with the video is met if the each of the first variable and the second variable has the second value.

20. The content distribution system of claim 18, wherein the condition associated with the video is that a current time is not later than an expiration date associated with the video.

* * * * *